June 23, 1931. J. V. O. PALM 1,811,366

THERMOSTATIC VALVE FOR AUTOMOBILES

Filed Jan. 9, 1924 2 Sheets-Sheet 2

INVENTOR.
John V. O. Palm
BY
Fay, Oberlin & Fay
ATTORNEYS

Patented June 23, 1931

1,811,366

UNITED STATES PATENT OFFICE

JOHN V. O. PALM, OF CLEVELAND HEIGHTS, OHIO

THERMOSTATIC VALVE FOR AUTOMOBILES

Application filed January 9, 1924. Serial No. 685,195.

The present invention, relating, as indicated, to thermostatic valves for automobiles, is more particularly directed to an improved type of thermostatically operated valve for use in the cooling system of an internal combustion engine, or in circulating systems generally, in which it is desirable to maintain the temperature of the circulating liquid between certain narrow limits. To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:—

Figure 1:
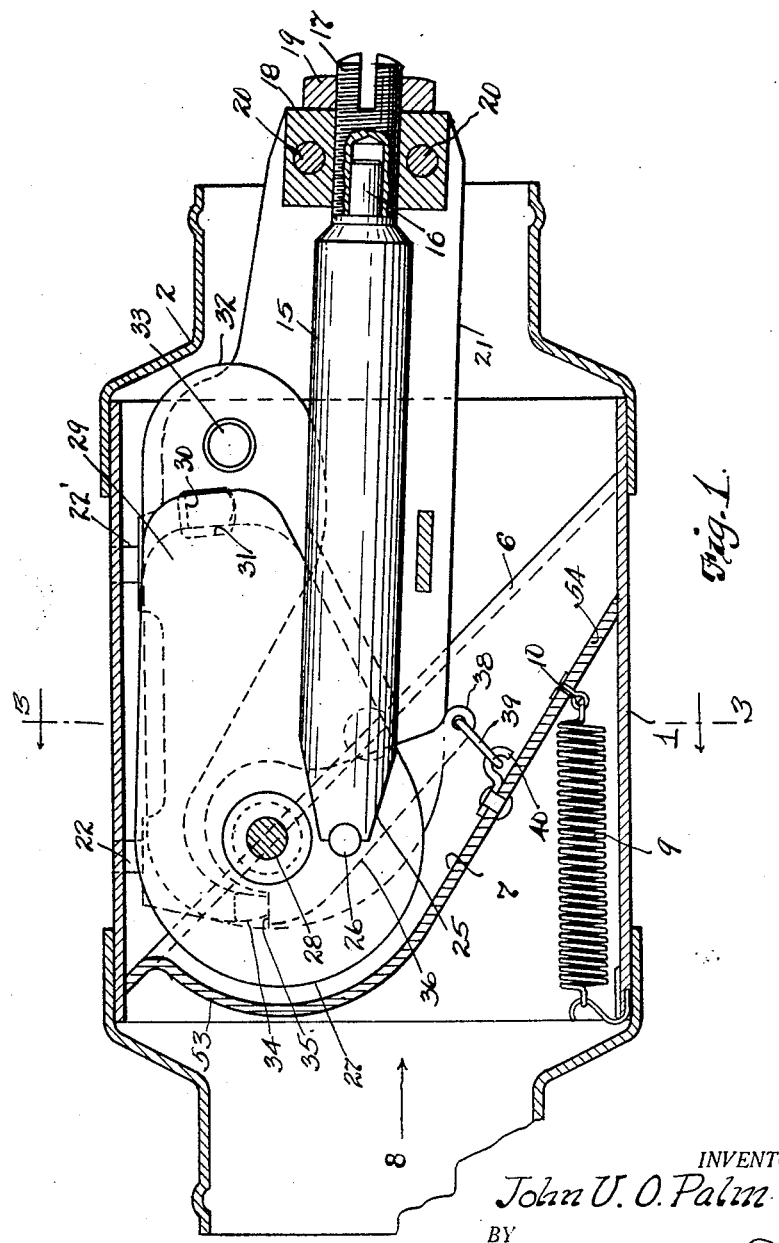
Figure 2:
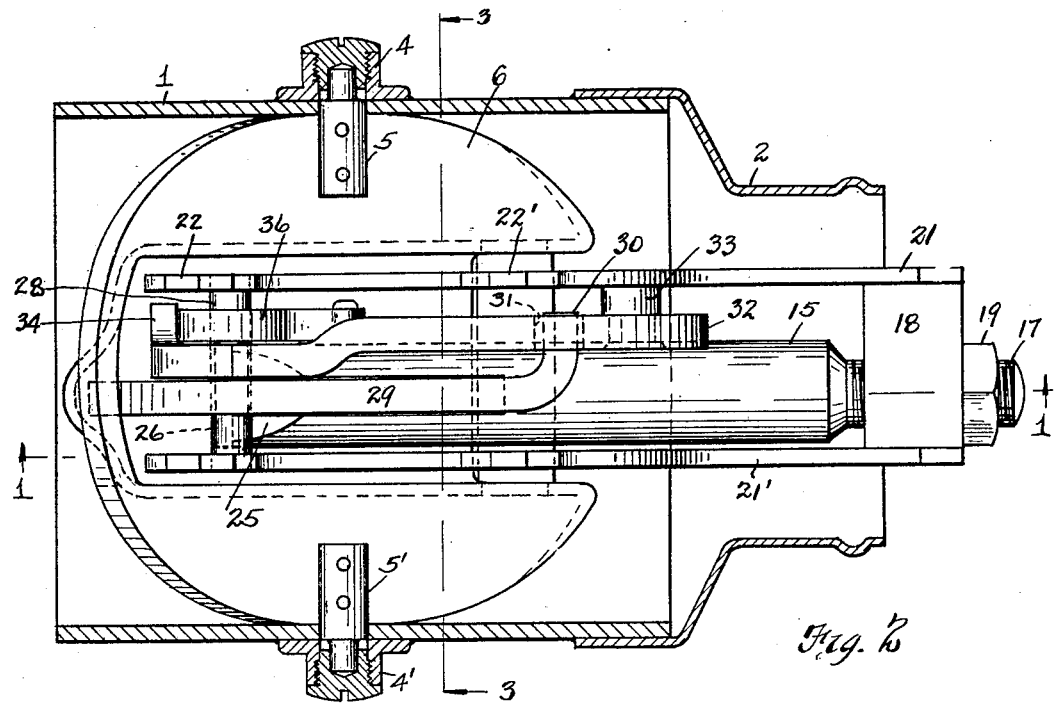
Figure 3:
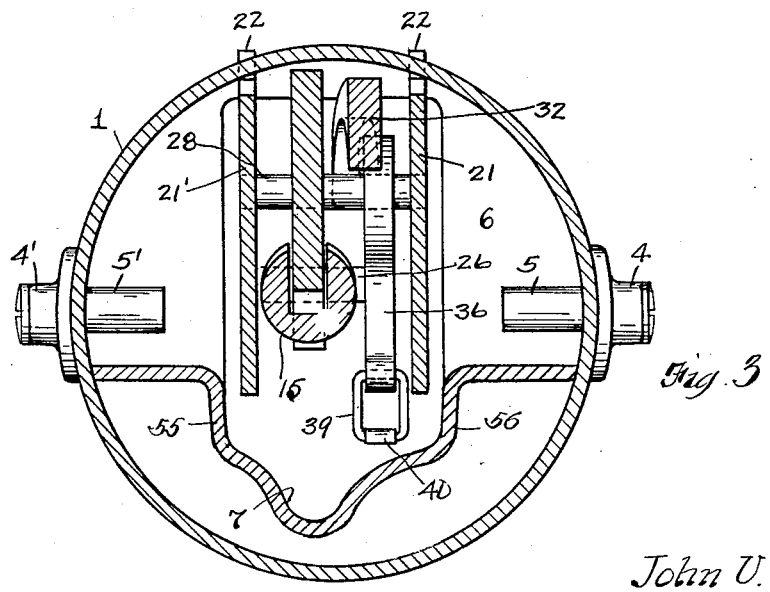

Fig. 1 is a longitudinal section through my device; Fig. 2 is a transverse longitudinal section, the plane of such section being taken at right angles to the plane of the section of Fig. 1; and Fig. 3 is a section on the line 3—3, Fig. 2.

The technical requirements of a thermostatic valve for the cooling system of an internal combustion engine include positiveness, and accuracy and uniformity in operation, while commercial considerations impose the additional requirements of low cost, convenient adjustability (to compensate for possible inaccurate workmanship) and compactness. None of those now in commercial use combine these characteristics since those employing hollow expansible members are subject to leakage and irregularity in operation and those having metallic chambers of the usual types are excessive in their first cost, and not sufficiently compact to permit of mounting in existing water circuits.

In the present invention I have sought to combine into a simple, compact and inexpensive structure the required characteristics of a satisfactory valve of the type described.

Referring now more particularly to Fig. 1, my device consists of a tubular member 1 adapted to be interposed in a circulating system of internal combustion engines, preferably in the conduit leading from the cylinder block to the radiator. Integrally mounted on one end of the member 1 is a second tubular member 2, which is adapted to be connected directly to the circulating conduit of the engine. Pivotally mounted in removable bearings carried in bosses 4 and 4' formed on opposite sides of the member 1, are stub shafts 5 and 5', on which is mounted a valve 6 of the butterfly type, which is provided with a recessed portion 7. This valve is mounted in the conduit in such a way that the cooled liquid will flow through the tubular member 1 in the direction of the arrow 8.

The valve is normally maintained in its closed position by means of a tension spring 9, which is secured in the manner indicated, and the valve is made to allow a certain amount of leakage to pass the valve for effecting the operation of the thermostatic means now to be described.

The means for operating the valve consist of a thermostatic bar 15, provided with a reduced end portion 16 which is received in a screw 17 adjustably mounted in the block 18, and maintained in any desired position by means of a lock nut 19. The block 18 is secured by pins or rivets 20 between two parallel plates 21 and 21', which constitute a frame within which the valve operating means are mounted and contained. The frame members 21 and 21', the outline of which is shown in Fig. 1, are provided with two upwardly extending lugs 22 and 22', which are secured in any desired manner in suitable recesses in a conduit member 1, thus locating the frame and members carried by it with respect to the conduit and the axis of the valve 6.

The frame composed of the members 21 and 21' and the connecting cross members 18 (and others to be described later) constitutes the non-expansive element of the thermostatic device in which the other or expansible element is the bar 15.

The members presently to be described for communicating the expansion or movement of the bar to the valve are mounted in the frame and are hence affected by the expansion, however slight, of the frame. The effective movement of the bar therefor is the difference in expansion between the bar and the frame. Accordingly I have made the frame of a high nickel content steel and the bar of a highly expansive bronze. The steel contains in excess of 30 per cent. nickel and the bronze has a composition of about 93 per cent. copper and 6 to 7 per cent. tin. These materials have greatly different coefficients of expansion.

The other end 25 of the thermostatic bar 15 is provided with a recess engaging against a pin 26, carried on a plate cam or lever 27. The lever 27 is oscillatorily mounted above a shaft or bearing 28, carried between the two frame members 21 and 21', and is provided with an extending portion 29 having a lateral offset end 30, which engages in a recess 31, formed in a second cam or lever 32, which is mounted about a pin or axis 33, also carried in the frame member 21. This second lever 32 is provided with a finger end 34, which engages against a shoulder 35 formed on a third cam or lever 36, this last being oscillatorily mounted about the axis 28 of the first-named lever 27. The third lever 36 is provided with an end portion 38, connected by means of a link 39 to a hook 40, attached to the recessed portion 7 of the valve 6.

The operation of the mechanism will be readily understood from the foregoing description. The conduit 1 is ordinarily mounted in an inclined position, with the right end higher than the other end. The circulating liquid which leaks through or past the valve 6 therefore fills the conduit above this valve and surrounds the thermostatic bar 15. As long as this liquid is cool there is no action of the thermostat, but as the liquid becomes heated under continued operation of the engine it produces an expansion in the bar 15, and this expansion is tremendously multiplied by the train of levers already described. The right end of the bar is fixed against longitudinal movement, and therefore expansion of the bar will press against the pin 26 and rotate the lever 27 in a clockwise direction. The engagement of the finger 30 in the hole 31 of the second lever 32 will thereupon produce a counterclockwise rotation of this second lever, which will in turn effect a similar counterclockwise movement of the third lever 36. The end of this third lever will carry with it the valve 7, the valve being moved in a counterclockwise direction, and thus opening the passage through the conduit 1 until such time as the temperature of the liquid flowing therethrough has been lowered sufficiently to allow the bar 15 to contract to its normal length. The spring 9 will maintain the lever train in operating relation, and will prevent any slackness between any of the bearing parts of these levers, and of the bar 15. Any initial slackness in the lever train may be taken up by proper adjustment of the screw 17 when the device is first assembled, the screw itself being turned down until the lever train is in operating engagement at the various points.

The axis of oscillation of the valve 6 is offset slightly with respect to the center line or axis of the tubular member 1 for the following reason. The pressure of the circulating liquid against the down stream surface of the valve 6 is at certain times very considerable, that is, just before the valve is opened. This pressure against the valve produces a slight pressure against the studs 5, upon which the valve is mounted over the projecting area of these bearings, and the friction thus produced must of course be overcome by the operating means before the valve can be opened. By offsetting the axis of the valve slightly from the center line of the member 1, the forces acting on the two halves of the valve are unbalanced sufficiently to produce a tendency to rotate the valve and thus open it equal to the frictional resistance to opening produced by the pressure against the projected area of the bearings for the valve. In the form of my invention shown in the drawings I have disposed the axis of oscillation of the valve slightly above the center line of the valve and of the conduit 1 for the above reason, in this way compensating and reducing the force necessary to be exerted by the bar to open the valve.

The valve 6 is provided with the recess 7, as described, the form of which is shown in Figs. 1 and 3. The recess is of sufficient extent in one direction (Fig. 1) to house the cam members shown. Its sectional view in the other directions is shown in Fig. 3 and is required for the following reasons. As soon as the valve 6 begins to open it is subject to the dynamic pressure of the column of liquid, as well as its static pressure. This pressure is less against the lower half of the valve and greater against the upper because of their form, since the wall 53 of the recess in the valve is practically at right angles to the direction of flow, while the wall 54 is assuming a position parallel with the flow. In order to prevent a decided increase in the resistance of the valve to opening I form the walls 55 and 56, of the recess, at a sharp angle to each other to retain the balance of the valve in respect to both static and velocity pressure of the fluid.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a valve for automobile engine circulating systems, the combination of a conduit adapted to be interposed in said system between the engine and the radiator, said conduit being slightly larger than the connections of said circulating system, a valve mounted in said conduit and movable to open or close the same, said valve cooperating with the inner wall of said conduit, a relatively non-expansible frame mounted longitudinally within said conduit, and in proximity to said valve, and means carried by said frame, said means being arranged parallel to the frame and including a temperature actuated expansible member and connections between the same and said valve for actuating the latter, said connections having a different coefficient of expansion than the expansible member.

2. In a valve for automobile engine circulating systems, the combination of a conduit adapted to be interposed in said system between the engine and the radiator, a valve in said conduit to open or close the same, means carried by said conduit for oscillatorily mounting said valve, a relatively non-expansible frame mounted longitudinally of said conduit and adjacent said valve, a temperature actuated expansible member having one end fixed in said frame, and multiplying means carried by said frame and engaging the free end of said member, said means being connected to said valve to actuate the same upon expansion of said member.

3. In a valve for automobile engine circulating systems, the combination of a conduit adapted to be interposed in said system between the engine and the radiator, a valve pivotally mounted in the wall of said conduit adapted to open and close the same, a relatively non-expansible frame mounted longitudinally of said conduit adjacent said valve, a temperature actuated expansible member having one end fixed in said frame, and multiplying means carried by said frame and engaging the free end of said member, said means being connected to said valve to actuate the same upon expansion of said member.

4. In a valve for automobile engine circulating systems, the combination of a conduit adapted to be interposed in said system between the engine and the radiator, a valve pivotally mounted in the wall of said conduit adapted to open and close the same, a relatively non-expansible frame, means on said frame for mounting the same within said conduit, a temperature actuated expansible member having one end fixed in said frame, and multiplying means carried by said frame and engaging the free end of said member, said means being connected to said valve to actuate the same upon expansion of said member.

5. In a valve for automobile engine circulating systems, the combination of a conduit adapted to be interposed in said system between the engine and the radiator, a valve oscillatorily mounted within said conduit, said valve being provided with a recessed portion in one side thereof, and means including a relatively non-expansible frame mounted within said conduit, a temperature actuated element carried by said frame, and multiplying levers transmitting the movement of said element for actuating said valve, said frame, levers, and element having their ends received within said valve recess.

6. In combination with a conduit and a frame, a flow control device comprising a valve oscillatorily mounted in said conduit and cooperating with the inner surface thereof to open and close said conduit, said frame fixedly mounted in said conduit adjacent said valve and having one end of an expansible bar mounted therein, said bar being parallel to a series of relatively non-expansible multiplying levers oscillatorily mounted in said frame, said levers engaging each other and the free end of said bar engaging one of said levers, and a link connecting the lever having the greatest movement to said valve, the expansion of said bar producing an opening movement of said valve.

Signed by me, this 31st day of December, 1923.

JOHN V. O. PALM.